US010010937B2

(12) United States Patent
Bunker (10) Patent No.: US 10,010,937 B2
(45) Date of Patent: *Jul. 3, 2018

(54) ADDITIVE MANUFACTURING METHOD FOR MAKING OVERHANGING TABS IN COOLING HOLES (71) Applicant: General Electric Company, Schenectady, NY (US)

(72) Inventor: Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 312 days.

This patent is subject to a terminal disclaimer.

(21) Appl. No.: 14/936,641

(22) Filed: Nov. 9, 2015

(65) Prior Publication Data

US 2017/0129013 A1 May 11, 2017

(51) Int. Cl.
*B22F 5/00* (2006.01)
*B22F 5/04* (2006.01)
*F01D 5/18* (2006.01)
*B22F 7/04* (2006.01)
*B22F 3/105* (2006.01)
*B22F 7/08* (2006.01)
*B33Y 10/00* (2015.01)
*B33Y 80/00* (2015.01)

(52) U.S. Cl.
CPC ............ *B22F 5/04* (2013.01); *B22F 3/1055* (2013.01); *B22F 7/04* (2013.01); *B22F 7/08* (2013.01); *F01D 5/186* (2013.01); *B33Y 10/00* (2014.12); *B33Y 80/00* (2014.12); *F05D 2260/202* (2013.01); *Y02P 10/295* (2015.11)

(58) Field of Classification Search
CPC .. B22F 5/04; B22F 3/1055; B22F 7/04; B22F 7/08; F01D 5/186
USPC .......................................................... 419/9
See application file for complete search history.

(56) References Cited

U.S. PATENT DOCUMENTS

| 4,705,455 | A | 11/1987 | Sahm et al. |
| 5,997,251 | A | 12/1999 | Lee |
| 8,632,311 | B2 | 1/2014 | Klasing et al. |
| 2013/0195673 | A1 | 8/2013 | Godfrey et al. |
| 2013/0280091 | A1 | 10/2013 | Propheter-Hinckley et al. |
| 2014/0079540 | A1 | 3/2014 | Morris et al. |
| 2014/0216042 | A1 | 8/2014 | Hanson |

(Continued)

FOREIGN PATENT DOCUMENTS

| EP | 2685170 A1 | 1/2014 |
| JP | 2014-092163 A | 5/2014 |

(Continued)

OTHER PUBLICATIONS

Extended European Search Report and Opinion issued in connection with corresponding EP Application No. 16197933.1 dated May 29, 2017.

(Continued)

*Primary Examiner* — Mark A Chapman
(74) *Attorney, Agent, or Firm* — Brian Overbeck (57) ABSTRACT A method of forming an overhanging structure at a discharge end of a cooling hole that passes through a component. The method includes the step of using an additive manufacturing process to fuse material to a face to build up an edge of the discharge end of the cooling hole to form an overhanging tab.

19 Claims, 8 Drawing Sheets (56) References Cited

U.S. PATENT DOCUMENTS

2015/0037498 A1 2/2015 Bruck et al.
2016/0303656 A1* 10/2016 Lacy .................... B23K 26/342

FOREIGN PATENT DOCUMENTS

| JP | 2014-177938 A | 9/2014 |
|----|---------------|--------|
| JP | 2015-067902 A | 4/2015 |
| WO | 2008/138385 A1 | 11/2008 |
| WO | 2013163037 A1 | 10/2013 |
| WO | 2014121060 A1 | 8/2014 |
| WO | 2014150490 A1 | 9/2014 |
| WO | 2014/197061 A2 | 12/2014 |
| WO | 2015/112384 A1 | 7/2015 |

OTHER PUBLICATIONS

Machine Translation and Decision to Grant issued in connection with corresponding JP Application No. 2016-211158 dated Dec. 5, 2017.

* cited by examiner

ADDITIVE MANUFACTURING METHOD FOR MAKING OVERHANGING TABS IN COOLING HOLES

BACKGROUND OF THE INVENTION

The present invention relates to hole formation in turbine components and more specifically to the formation of an overhanging tab on the upstream portion of the discharge end of a film hole using an additive manufacturing process.

Airfoils in a turbine engine often include cooling holes for discharging a film of cooling air along the outer surface of the airfoil to affect film cooling. These may be referred to as "film cooling holes" or "film holes."

Generally, cooling holes extend through a wall in an aircraft component from an entry end to an exit end. In some cooling holes, the exit end is configured as a generally conical diffuser and is positioned in a surface of an aircraft component that has a leading edge and a trailing edge. It is sometimes desirable that instead of being conical, the diffuser section of a cooling hole be configured such that the upstream side overhangs the exit. In this regard, flow through the cooling hole as it nears the exit side of the cooling hole is turned to be closer to tangential to the local hot gas surface being protected by the film cooling. The flow in the exit end of the cooling hole is turned such that the flow is more parallel to the surface to which the exit end of the cooling hole discharges.

To cause this turn in flow, an overhanging tab is positioned at the leading edge of the exit end of the cooling hole. The overhanging tabs are configured such that they extend toward the trailing edge of the cooling hole exit. Such overhanging tabs can be very thin and therefore are difficult to make using conventional means.

Conventional methods for forming film cooling holes include casting and machining. One problem with film holes produced by conventional methods is that they are limited with regard to thinness. In this regard, some conventional methods are incapable of forming thin overhanging tabs in that edges formed by these methods have a minimum radius and that minimum radius is greater than that desired for the overhanging tabs. While some conventional methods are capable of forming overhanging tabs with the desired thin edge, they are not capable of producing such overhanging tabs with the desired consistent thickness and sufficient size.

BRIEF DESCRIPTION OF THE INVENTION

This need is addressed by a method of forming a thin tab on the upstream portion of the discharge end of a film hole using an additive manufacturing process.

According to one aspect of the technology described herein, a method is provided for forming an overhanging structure at a discharge end of a cooling hole that passes through a component. The method includes the step of using an additive manufacturing process to fuse material to a face to build up an edge of the discharge end of the cooling hole to form an overhanging tab.

According to another aspect of the technology described herein, a method is provided for forming a thin upstream edge of a cooling hole on a turbine component having a component wall with inner and outer surfaces, wherein the cooling hole passes through the component wall and fluidly connects the inner surface and the outer surface. The method includes removing a portion of a discharge end of the cooling hole so as to form a first surface positioned between the outer surface and the cooling hole; and using an additive manufacturing process to build a structure that extends away from the first surface toward the trailing edge of the discharge end of the cooling hole on the first surface.

BRIEF DESCRIPTION OF THE DRAWINGS

The invention may be best understood by reference to following description taken in conjunction with the accompanying drawing figures in which.

DETAILED DESCRIPTION OF THE INVENTION

Figure 1:
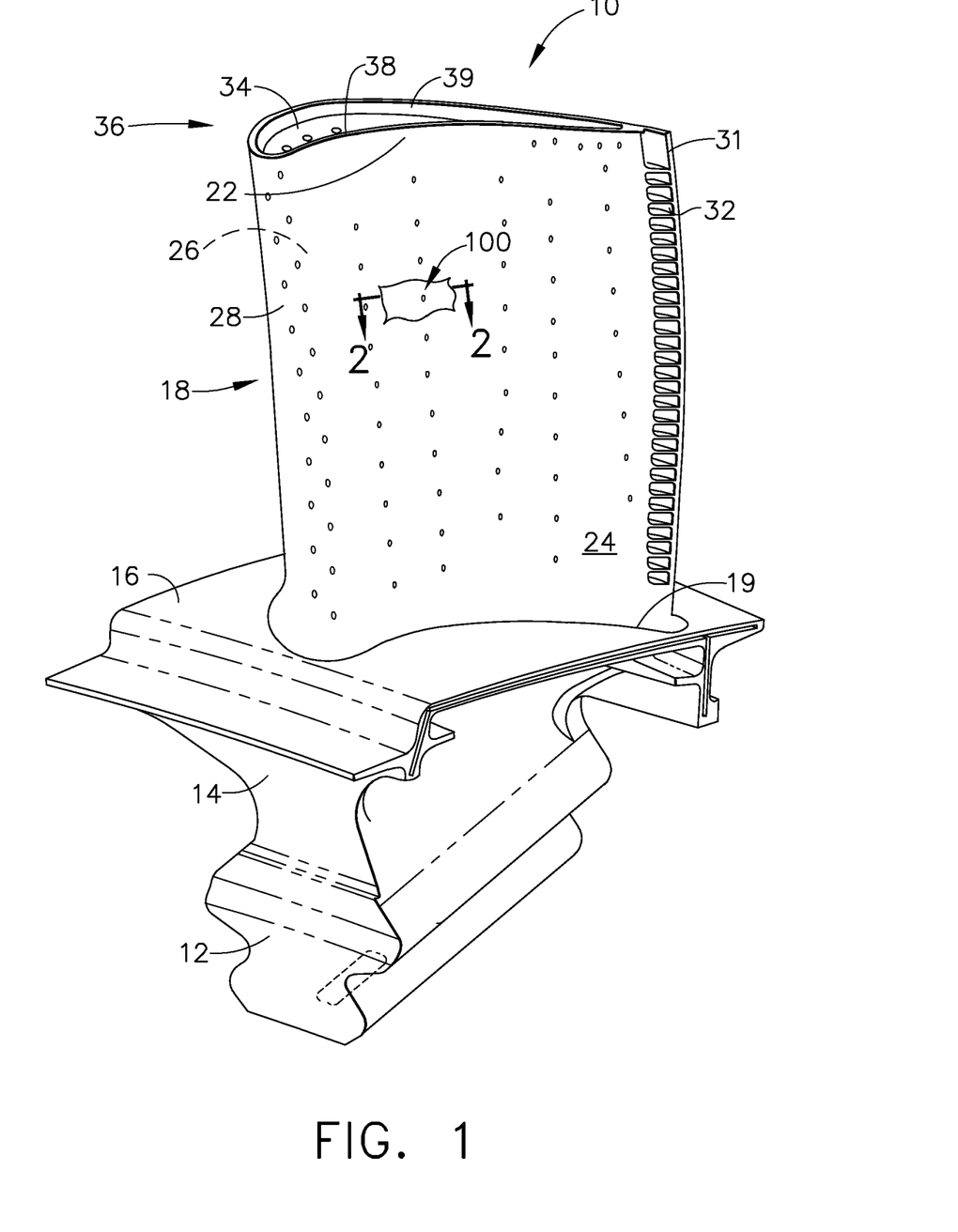
FIG. 1 is a perspective view of a turbine blade for inclusion in an aircraft engine wherein a wall of the turbine blade includes multiple film holes for cooling the wall.

Referring to the drawings wherein identical reference numerals denote the same elements throughout the various views, FIG. 1 illustrates an exemplary turbine blade 10. The turbine blade 10 includes a conventional dovetail 12, which may have any suitable form including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. A hollow airfoil 18 extends radially outwardly from the platform 16 and into the hot gas stream. The airfoil has a root 19 at the junction of the platform 16 and the airfoil 18, and a tip 22 at its radially outer end. The airfoil 18 has a concave pressure side wall 24 and a convex suction side wall 26 joined together at a leading edge 28 and at a trailing edge 31.

The airfoil 18 may take any configuration suitable for extracting energy from the hot gas stream and causing rotation of the rotor disk. The airfoil 18 may incorporate a plurality of trailing edge bleed slots 32 on the pressure side wall 24 of the airfoil 18, or it may incorporate a plurality of trailing edge cooling holes (not shown). The tip 22 of the airfoil 18 is closed off by a tip cap 34 which may be integral to the airfoil 18 or separately formed and attached to the airfoil 18. An upstanding squealer tip 36 extends radially outwardly from the tip cap 34 and is disposed in close proximity to a stationary shroud (not shown) in the assembled engine, in order to minimize airflow losses past the tip 22. The squealer tip 36 comprises a suction side tip wall 38 disposed in a spaced-apart relationship to a pressure side tip wall 39. The tip walls 39 and 38 are integral to the airfoil 18 and form extensions of the pressure and suction side walls 24 and 26, respectively. The outer surfaces of the pressure and suction side tip walls 38 and 39 respectively form continuous surfaces with the outer surfaces of the pressure and suction side walls 24 and 26. A plurality of film cooling holes 100 pass through the exterior walls of the airfoil 18. The film cooling holes 100 communicate with an interior (not shown) of the airfoil 18, which may include a complex arrangement of cooling passageways defined by internal walls, such as a serpentine configuration. It is noted that airfoil 18 may be made from a material such as a nickel- or cobalt-based alloy having good high-temperature creep resistance, known conventionally as "superalloys."

Figure 2:
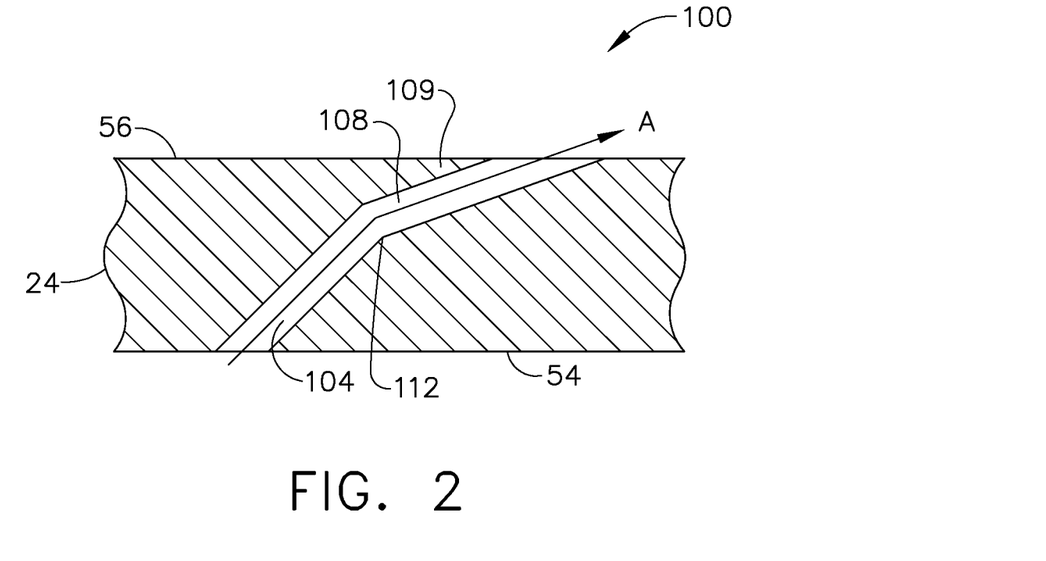
FIG. 2 is a cross-sectional view of a portion of the turbine blades shown in FIG. 1 taken at line 2-2 showing a complex film hole formed in accordance with a method for manufacturing the film hole by additive manufacturing.
Figure 3:
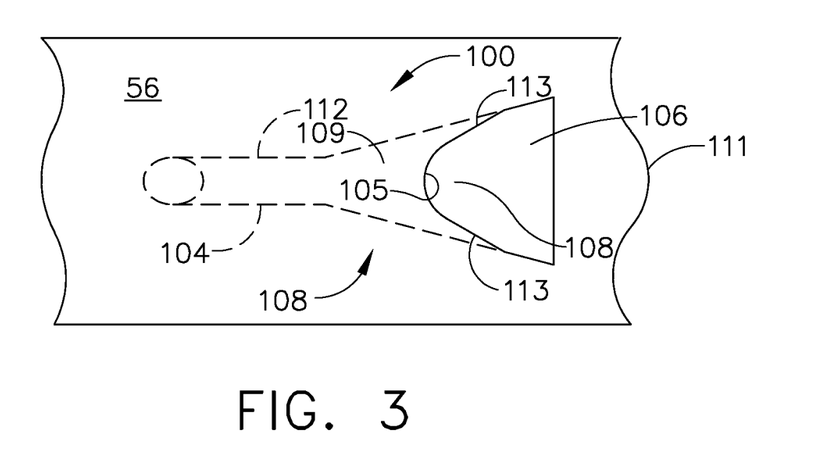
FIG. 3 is a plan view of a portion of the turbine blade shown in FIG. 1 showing a complex film hole.

FIGS. 2 and 3 illustrate one of the film cooling holes 100 in more detail. The film hole 100 extends from an interior surface 54 of the pressure side wall 24 to an outer surface 56 of the pressure side wall 24. The film hole 100 includes an entry section 104 and an exit section 108. The exit section 108 includes an overhanging tab 109 that forms a section of a rim 111. The overhanging tab 109 defines an extension of the outer surface 56 over at least an upstream area 105 of the exit section 108. The overhanging tab 109 can be configured such that it extends around the rim 111 toward a downstream area 106 via sides 113. The sides 113 of the overhanging tab 109 taper such that the overhanging tab 109 gradually retreats from over section 108 at points of the rim 111 that are farther from the upstream section. As shown in FIG. 3, overhanging tab 109 defines an arc in plan view that is oriented such that it opens toward the downstream area 106. It should be appreciated that overhanging tab 109 according to other aspects can define any other desired shape in plan view including curved convex, concave, or geometric patterns such as sawtooth-shaped. The entry section 104 is often referred to as a "metering section," and is generally round. The entry section 104 and the exit section 108 meet at a transition area 112. In this regard, the entry section 104 extends from interior surface 54 to the transition area 112.

The exit section 108 has an increasing flow area from the transition area 112 to the outer surface 56. As seen in FIGS. 2 and 3, the dimensions of the exit section 108 increase in the lateral direction along the direction of flow. This type of structure is often referred to as a "diffuser section" and may take on various shapes such as conical, quadrilateral, or multifaceted.

The film hole 100 is configured such that it defines a nonlinear fluid flow path A. Fluid path A changes direction and expands as it passes through transition area 112. The film cooling hole 100 is an example of a complex film hole and more specifically, complex film hole 100 is an example of a non-line-of-sight hole. As used herein, the term "complex" refers to any hole including any portion or feature other than a bore having a single straight circular cross-section. By way of example and not limitation, such holes include those that cannot be manufactured by common methods such as laser drilling and electro-discharge machining.

Figure 4:
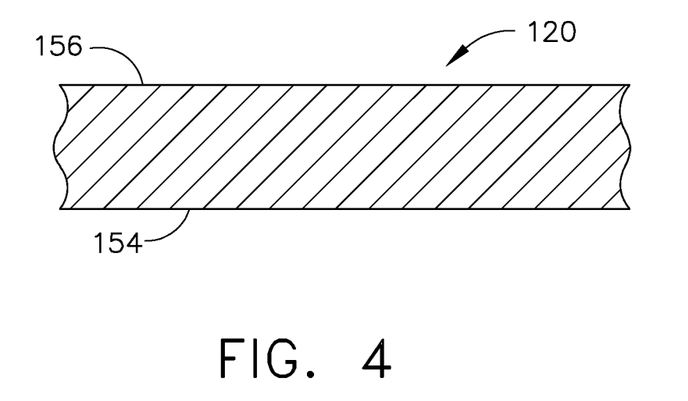
FIG. 4 is a cross-sectional view of a portion of a wall section blank generated during one step of the manufacturing process of the turbine blade of FIG. 1 taken along line 2-2 in FIG. 1.
Figure 5:
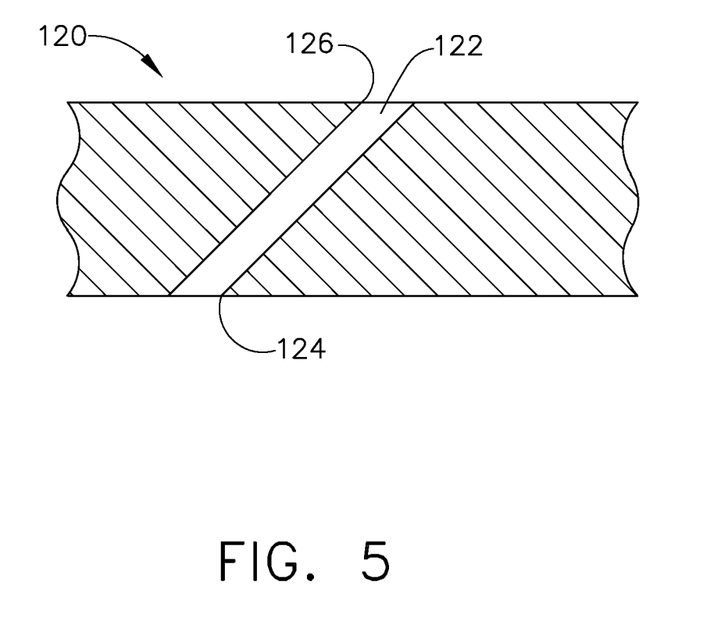
FIG. 5 is a cross-sectional view of the wall section of FIG. 3, showing a bore formed therethrough.

A method of manufacturing a complex film hole such as film hole 100 will now be described. First, a wall section 120 as shown in FIG. 4 is provided. The wall section 120 is generally representative of the wall section of any turbine component, of any shape such as flat, convex, concave, and/or complexly curved. Such as the suction side wall 26 described above, and includes opposed inner and outer surfaces 154 and 156 respectively. It should be understood that the providing step of the wall section 120 includes but is not limited to manufacturing of the wall section 120 or obtaining a pre-manufactured wall section 120. Methods of manufacturing the wall section 120 include but are not limited to those conventionally known such as casting, machining, and a combination thereof. Secondly according to the illustrated embodiment, a bore 122 as shown in FIG. 5 is formed through the wall section 120. It should be appreciated that the bore 122 is formed according to conventional means such as machining, drilling. Additionally, the bore 122 can be formed during the formation of the wall section 120 by a method such as casting.

Figure 6A:
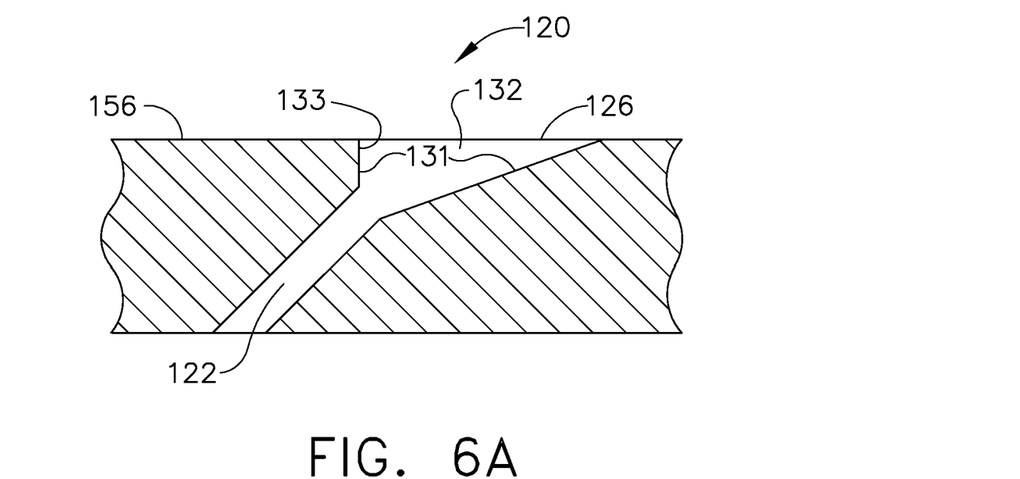
FIG. 6A is a cross-sectional view of a portion of the turbine component of FIG. 5, showing that material has been removed from the turbine component such that a recess is defined.
Figure 6B:
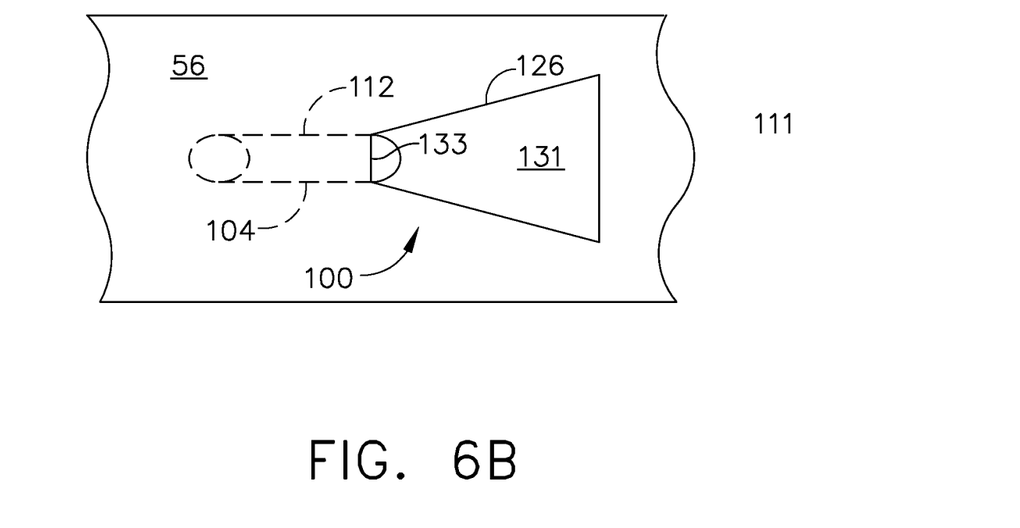
FIG. 6B is a plan view of a portion of the turbine component of FIG. 5, showing that material has been removed such that a recess is defined.

Bore 122 extends from a first end 124 to a second end 126. Referring to FIGS. 6A and 6B, the next step is removing a portion of the wall section 120 that encompasses the second end 126 of the bore 122. Which is optionally followed by removing a further portion of the wall section 120 such that the second end 126 of the bore 122 is redefined around at least some of its circumference. In this manner, recess 132 is formed at second end 126 of the tube and prepared to receive additional material. Recess 132 is in fluid communication with surface 156 and bore 122. Recess 132 is defined by a surface 131 and includes a face 133. By way of example and not limitation, recess 132 and face 133 can be formed by one of the following processes; milling, casting, drilling, machining, and a combination thereof. It should be appreciated that in some conventional manufacturing processes, narrow points are not formable or are broken off during handling. It is believed that in these conditions, a face 133 can be unintentionally formed. Such a face 133 might not be substantially flat but may instead have a round or rough profile. Such a profile would be suitable for the method described below. It should be appreciated that face 133 can be in any orientation relative to surface 156 and can be shaped in any way capable with known manufacturing techniques.

Following the steps of preparing bore 122 for receiving additional material near the second end 126, steps related to reconfiguring second end 126 of bore 122 using an additive manufacturing process are implemented.

Figure 7:
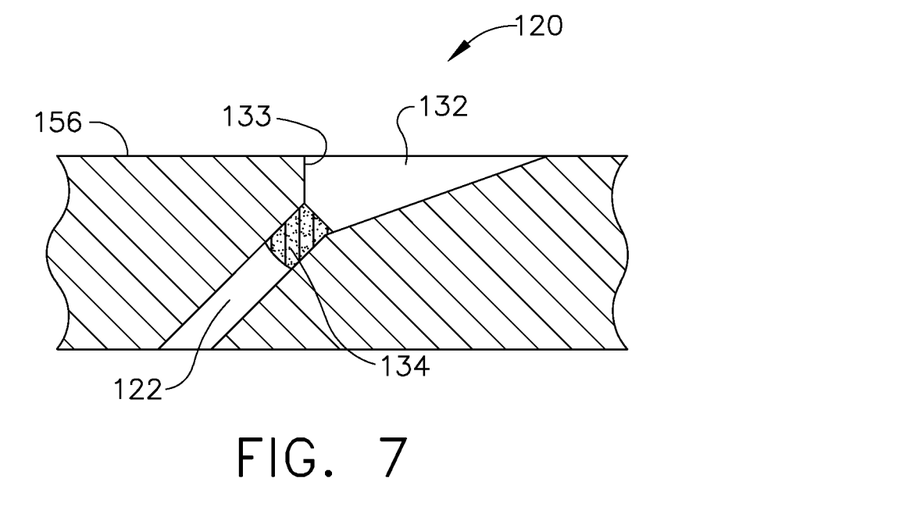
FIG. 7 is a cross-sectional view of a portion of the wall section shown in FIG. 6 wherein a section of the hole near the recess has been blocked.

The additive manufacturing process can optionally begin with a step of blocking bore 122 with a plug 134 as shown in FIG. 7 such that face 133 remains exposed. It should be appreciated that blocking of bore 122 is not necessary and that the additive manufacturing process can begin with a step of positioning wall section 120 or it can begin with the steps of applying an adhesive and/or applying powder. In the illustrated embodiment, plug 134 is positioned where bore 122 engages recess 132 and is configured such that the powder from subsequent additive manufacturing steps is prevented from entering bore 122. It should be appreciated that by way of example and not limitation, bore 122 can be blocked utilizing at least one of the following materials: a polymer, unfused powder, a wax or other material, and a combination thereof. It should be appreciated that these materials are chosen such that they can be removed from the finished part by solvation, mechanical means, heat, or a combination thereof.

An optional step of applying an adhesive substance to the face 133 in predetermined locations can be performed.

Figure 8:
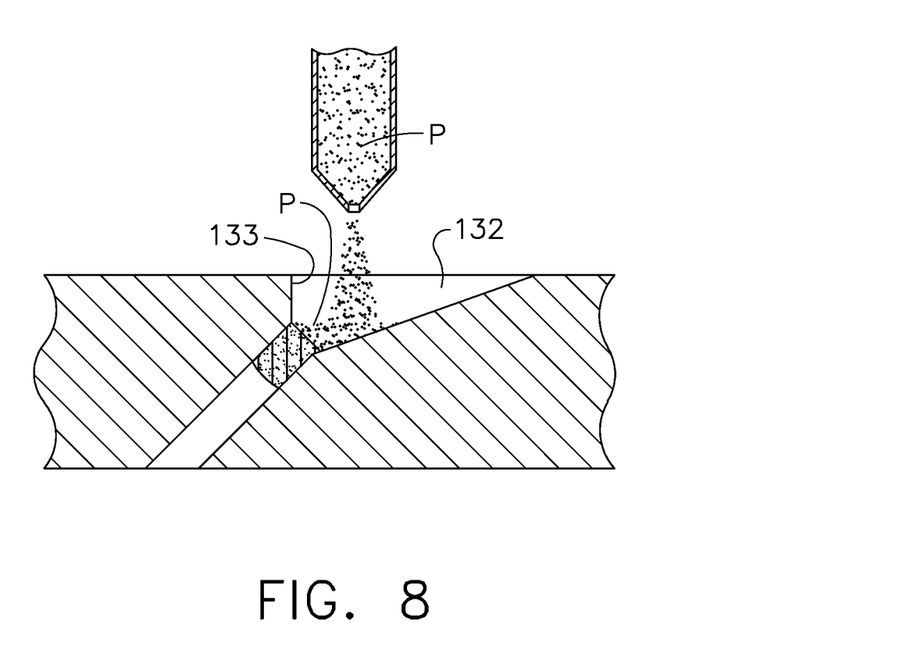
FIG. 8 is a cross-sectional view of a portion of the wall section of FIG. 7, showing powder being applied to the wall section.

As shown in FIG. 8, a powder P for example, metallic, ceramic, and/or organic powder is deposited into the recess 132. Powder is added to recess 132 until it reaches a predetermined level. Preferably, this predetermined level includes a first layer of powder to be fused, typically where construction of overhanging tab 159 begins at face 133. As a non-limiting example, the thickness of the powder layer may be about 10 micrometers (0.0004 in.).

The powder P may be applied by dropping or spraying the powder over the recess 132, or by dipping the wall section 120 in powder. Powder application may optionally be followed by brushing, scraping, blowing, or shaking as required to remove excess powder, for example to obtain a uniform layer. It is noted that the powder application process does not require a conventional powder bed or planar work surface, and the part may be supported by any desired means, such as a simple worktable, clamp, or fixture.

Figure 9:
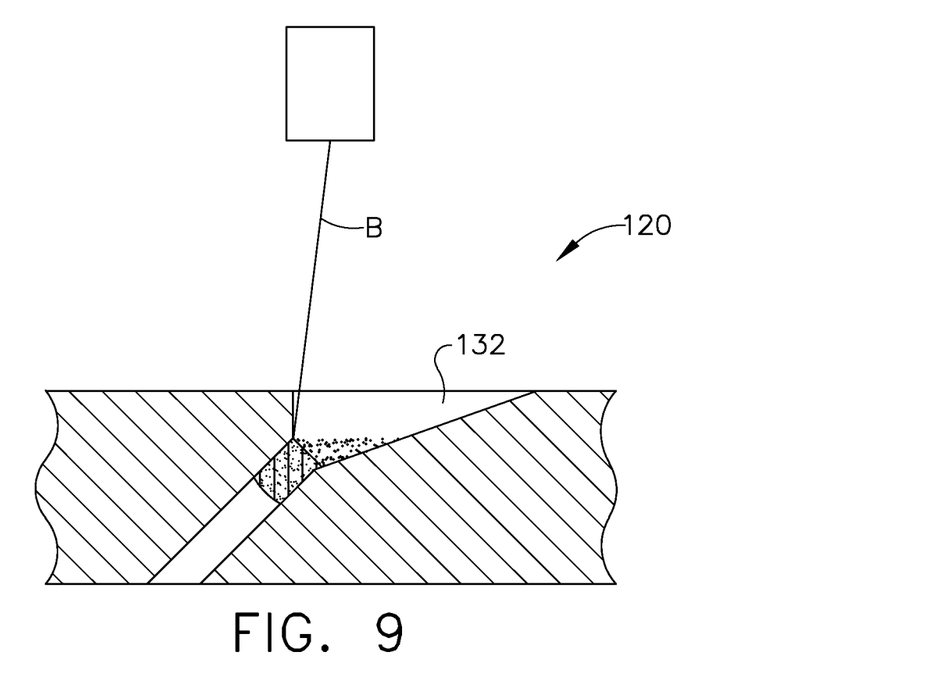
FIG. 9 is a cross-sectional view of a portion of the wall section of FIG. 8, showing powder being fused.

As can be seen in FIG. 9, once the powder P is deposited to the predetermined level in recess 132 of the wall section 120, a directed energy source B (such as a laser or electron beam) is used to melt a layer of the structure being built. The directed energy source emits a beam and a beam steering apparatus is used to steer the beam over the exposed powder surface in an appropriate pattern. The exposed layer of the powder is heated by the beam to a temperature allowing it to melt, flow, and consolidate and fuse to or adhere to substrate with which it is in contact. In this manner, the metallic particles that made up powder P now exist as part of the wall section 120. This step may be referred to as fusing the powder. Unfused powder can be removed at this stage prior to the next cycle of applying an adhesive, applying powder, and fusing the powder. However, in the illustrated embodiment, unfused powder that is not removed in each step remains in place. In this regard the unfused powder can operate to support powder of the next layer.

Figure 10:
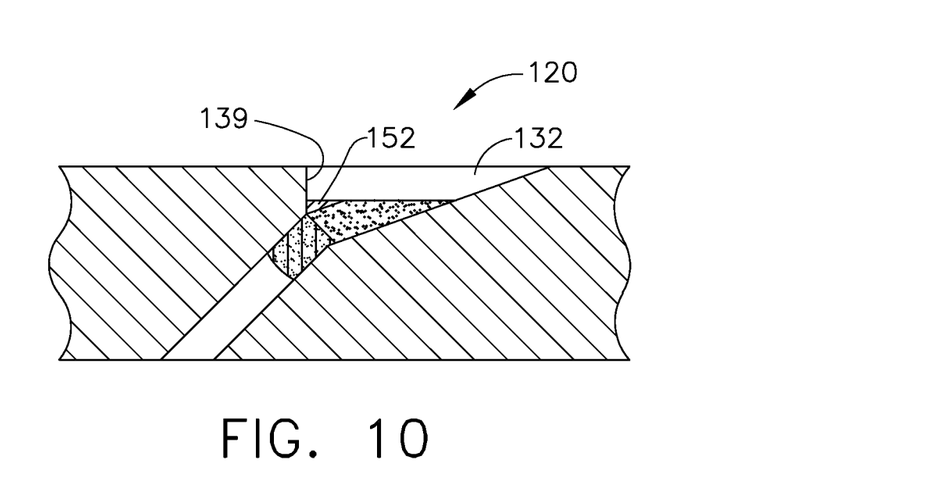
FIG. 10 is a cross-sectional view of a portion of the wall section of FIG. 9, showing new material that has been added to the recess to define a portion of a transition area for a diffuser section beginning at the end of the blocked hole.
Figure 11:
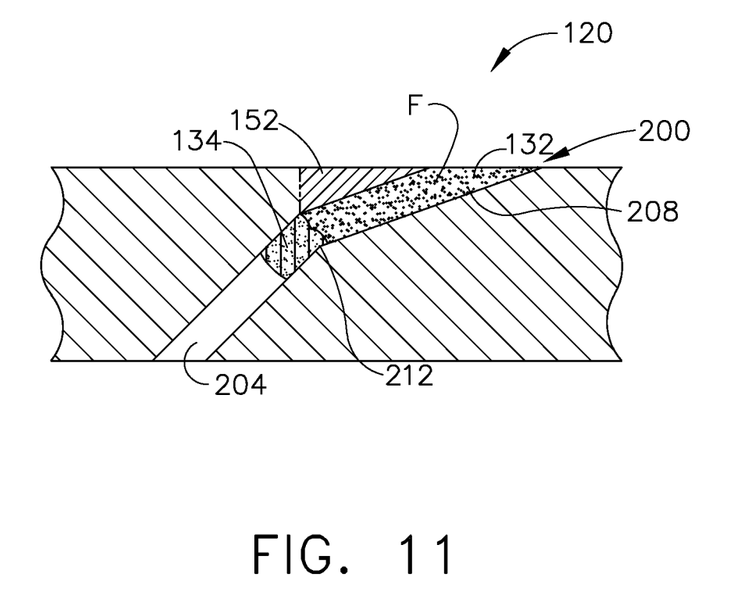
FIG. 11 is a cross-sectional view of a portion of the wall section of FIG. 10, showing additional new material that has been added to the recess.
Figure 12:
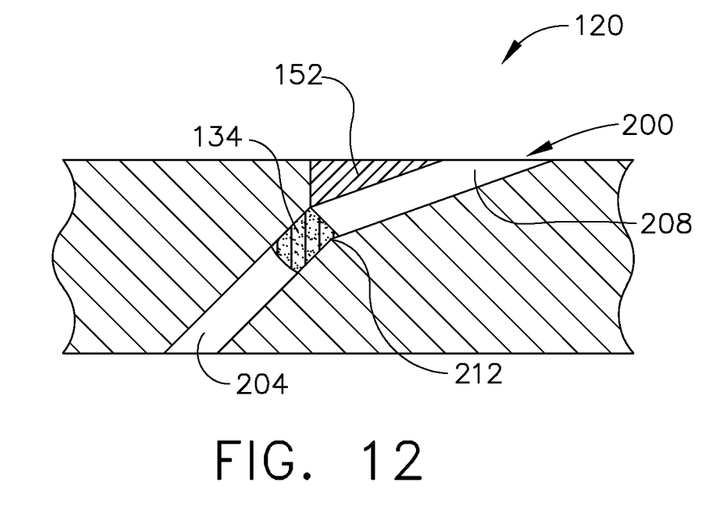
FIG. 12 is a cross-sectional view of the wall section FIG. 11 where in the unfused powder has been removed.
Figure 13:
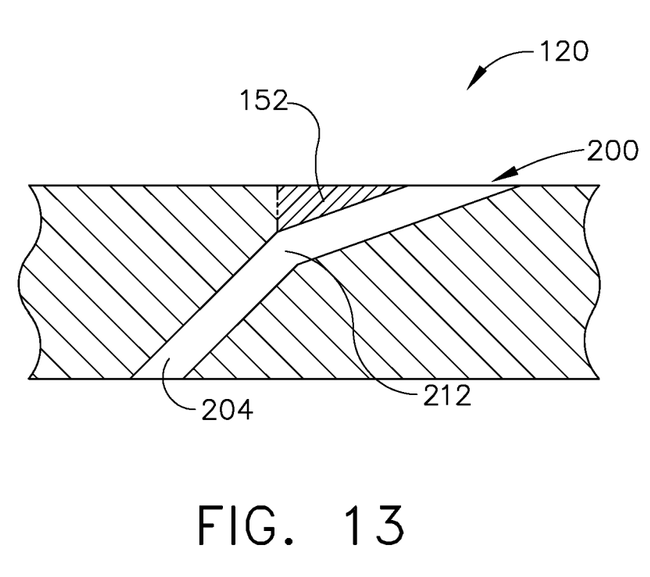
FIG. 13 is a cross-sectional view of the wall section shown in FIG. 12 wherein the blocking material has been removed and the profile of a complex film hole manufactured in accordance with the method described below is shown.

This cycle of adhering powder, removing excess powder, and then directed energy melting the powder is repeated until the entire component is complete. As shown in FIG. 10, new material 152 is built up gradually as portions of layer after layer are fused. In this manner, portions of an overhanging tab are formed as recess 132 is gradually filled with powder P When the component is complete, as shown in FIGS. 11,12, and 13, new material 152 is positioned in recess 132 and defines film hole 200. Film hole 200 includes an entry section 204, and exit section 208, the transition section 212. Film hole 200 is at least partially filled with filler F. By way of example and not limitation, filler F includes one of the following: unfused powder P, adhesive, blocking material 134, and a combination thereof. In a finishing step filler F and any other unfused and unbonded powder or adhesive from previous steps can be removed in one cleaning step. Alternatively, two cleaning steps could be used. One to remove loose filler F material by air pressure or air jet resulting in structure shown in FIG. 12. And a second for removing plug 134 by a method such as dissolving with solvents, using heat to disperse, or the like which results in the structure shown in FIG. 13. It should be noted that the structure shown in FIG. 13 is substantially the same as that shown in FIG. 2 except new material added via the present method is highlighted.

The process described is merely one example of an additive manufacturing process. "Additive manufacturing" is a term used herein to describe a process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Sterolithography (SLA), Electron Beam Melting (EBM), Laser Engineered Net Shaping (LENS), and Direct Metal Deposition (DMD).

The process described herein has several advantages over the prior art. The additive manufacturing process is far more flexible as to shape and configuration of film holes that can be manufactured. In addition, it is believed that the additive manufacturing process allows lower heat generation during formation of film holes and thus less deformation of crystalline structure and turbine blade shape.

The method described above provides a means for creating overhanging tabs in film holes or other similar orifices of complex exit shaping, without the need for conventional machining processes such as drilling, EDM forming, or laser trepanning. It avoids the complexities of such conventional methods by permitting a complex exit shape to be formed in a single process. This will permit both flexibility and cost reductions in making complex cooled components. This in turn has the potential of increasing cooling efficiency of turbine components and lowering engine specific fuel consumption ("SFC").

The foregoing has described an apparatus and method for additive manufacturing of shaped exit holes of film holes in turbine blades and more specifically, overhanging tabs in film hole exits. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A method of forming an overhanging structure at a discharge end of a cooling hole that passes through a component, the method comprising:

using an additive manufacturing process to fuse material to a face to build up an edge of the discharge end of the cooling hole to form an overhanging tab.

2. The method of claim 1 further comprising depositing powder in a recess located at the discharge end of the cooling hole; and fusing the powder in a pattern corresponding to a layer of the structure.

3. The method of claim 2 further comprising repeating in a cycle the steps of depositing and fusing to build up the overhanging structure in a layer-by-layer fashion.

4. The method of claim 3 wherein the repeating cycle of depositing and fusing results in the component wall including both fused and un-fused powder, the method further comprising removing the un-fused powder.

5. The method of claim 2 wherein a multiple of separate subsequent layers is directly fused to the face.

6. The method of claim 5 further comprising fusing adjacent subsequent layers directly to the face.

7. The method of claim 2 further comprising forming a plug in the cooling hole and depositing powder on the plug.

8. The method of claim 7 further comprising fusing the powder such that unfused powder is left over at least a portion of the plug.

9. The method of claim 8 further comprising forming the overhanging tab by fusing subsequent layers such that unfused powder of each subsequent layer overlaps unfused powder of the previous layer.

10. The method of claim 1 further comprising building up an upstream edge of the discharge end.

11. The method of claim 1 wherein the component comprises a metal alloy.

12. The method of claim 1 wherein the powder comprises a metal alloy.

13. A method of forming a thin upstream edge of a cooling hole on a turbine component having a component wall with inner and outer surfaces, wherein the cooling hole passes through the component wall and fluidly connects the inner surface and the outer surface, the method comprising:

removing a portion of a discharge end of the cooling hole so as to form a first surface positioned between the outer surface and the cooling hole; and using an additive manufacturing process to build a structure that extends away from the first surface toward the trailing edge of the discharge end of the cooling hole on the first surface.

14. The method of claim 13 further comprising depositing powder on the first surface; and fusing the powder in a pattern corresponding to a layer of the structure.

15. The method of claim 14 further comprising repeating in a cycle the steps of depositing and fusing to build up the structure in a layer-by-layer fashion.

16. The method of claim 15 wherein the repeating cycle of depositing and fusing results in the component including both fused and un-fused powder, the method further comprising removing the un-fused powder.

17. The method of claim 14 further comprising forming a plug in the cooling hole and depositing powder in a layer that at least partially overlaps the plug.

18. The method of claim 17 further comprising fusing the powder in the layer such that the pattern leaves unfused powder over at least a portion of the plug.

19. The method of claim 18 further comprising repeating the steps of depositing powder and using until unfused powder layers extend above the outer surface of the component; and removing excess to fuse the material such that the outer surface of the component is smoothly extended over the cooling hole.

* * * * *